US012080171B2

(12) United States Patent
Inoue et al.

(10) Patent No.: US 12,080,171 B2
(45) Date of Patent: Sep. 3, 2024

(54) ALERT CONTROL DEVICE, MOBILE OBJECT, ALERT CONTROLLING METHOD AND COMPUTER-READABLE STORAGE MEDIUM

(71) Applicant: HONDA MOTOR CO., LTD., Tokyo (JP)

(72) Inventors: Shigeru Inoue, Saitama (JP); Takahiro Kurehashi, Saitama (JP); Moriya Horiuchi, Saitama (JP); Yuta Sakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 157 days.

(21) Appl. No.: 17/840,537

(22) Filed: Jun. 14, 2022

(65) Prior Publication Data

US 2022/0406191 A1 Dec. 22, 2022

(30) Foreign Application Priority Data

Jun. 18, 2021 (JP) ................................ 2021-101990

(51) Int. Cl.
*G08G 1/16* (2006.01)

(52) U.S. Cl.
CPC .................................. *G08G 1/167* (2013.01)

(58) Field of Classification Search
None
See application file for complete search history.

(56) References Cited

U.S. PATENT DOCUMENTS 9,424,749 B1 * 8/2016 Reed ...................... G08G 1/166
11,814,041 B2 * 11/2023 Komuro ................ G08G 1/163
(Continued)

FOREIGN PATENT DOCUMENTS

CN 104567909 A 4/2015
CN 204249904 U 4/2015
(Continued)

OTHER PUBLICATIONS

Office Action issued for counterpart Japanese Application No. 2021-101990, issued by the Japanese Patent Office on Dec. 13, 2022 (drafted on Dec. 8, 2022).
(Continued)

*Primary Examiner* — Muhammad Adnan

(57) ABSTRACT

An alert control device including: a risk area identifying unit for identifying a risk area outside a mobile object based on operation information of the mobile object; a transmission control unit for controlling transmission of risk area information containing risk area location information outward the mobile object; a reception control unit for controlling reception of response information for the risk area information; and the output control unit for controlling output of alert information at least into the mobile object based on the response information. An alert controlling method including: identifying a risk area outside a mobile object based on operation information of the mobile object; controlling transmission of risk area information containing risk area location information outward the mobile object; controlling reception of response information for the risk area information; and controlling output of alert information at least into the mobile object based on the response information.

19 Claims, 7 Drawing Sheets

(56) References Cited

U.S. PATENT DOCUMENTS

| | | | | |
|---|---|---|---|---|
| 11,842,643 | B2 * | 12/2023 | Kurehashi | G06V 20/58 |
| 2015/0105108 | A1 | 4/2015 | Lee | |
| 2018/0047291 | A1 | 2/2018 | Konishi | |
| 2018/0233049 | A1 * | 8/2018 | Ishii | G08G 1/162 |
| 2018/0244195 | A1 * | 8/2018 | Haight | G01S 13/867 |
| 2019/0385457 | A1 * | 12/2019 | Kim | G08G 1/166 |
| 2020/0128372 | A1 | 4/2020 | Zhang | |
| 2020/0331470 | A1 | 10/2020 | Nanri | |
| 2020/0349843 | A1 | 11/2020 | Liu | |
| 2021/0001889 | A1 | 1/2021 | Furukawa | |
| 2021/0314843 | A1 * | 10/2021 | Yang | H04W 4/02 |
| 2022/0084409 | A1 * | 3/2022 | Kurehashi | G06V 40/103 |
| 2022/0084410 | A1 * | 3/2022 | Kurehashi | G08G 1/161 |
| 2022/0262128 | A1 | 8/2022 | Nakamura | |
| 2022/0289189 | A1 * | 9/2022 | Komuro | G01S 13/867 |
| 2022/0388506 | A1 * | 12/2022 | Horiuchi | G06V 20/58 |
| 2022/0388528 | A1 * | 12/2022 | Sakagawa | B60W 30/095 |
| 2022/0392346 | A1 * | 12/2022 | Sakagawa | G08G 1/16 |
| 2022/0406076 | A1 * | 12/2022 | Horiuchi | G06V 20/58 |
| 2022/0406179 | A1 * | 12/2022 | Kurehashi | G08G 1/166 |
| 2022/0406187 | A1 * | 12/2022 | Kurehashi | G08G 1/166 |
| 2022/0406189 | A1 * | 12/2022 | Kurehashi | H04W 4/12 |
| 2022/0406190 | A1 * | 12/2022 | Kurehashi | G08G 1/005 |
| 2023/0306752 | A1 * | 9/2023 | Horiuchi | G06V 10/95 |

FOREIGN PATENT DOCUMENTS

| | | | |
|---|---|---|---|
| CN | 106184057 | A | 12/2016 |
| CN | 110430401 | A | 11/2019 |
| CN | 111055840 | A | 4/2020 |
| CN | 111164663 | A | 5/2020 |
| CN | 111489564 | A | 8/2020 |
| CN | 111886639 | A | 11/2020 |
| CN | 112954869 | A | 6/2021 |
| JP | 2008299676 | A | 12/2008 |
| JP | 2018026009 | A | 2/2018 |
| JP | 2018133072 | A | 8/2018 |
| WO | 2018193535 | A1 | 10/2018 |
| WO | 2020188974 | A1 | 9/2020 |
| WO | 2021009534 | A1 | 1/2021 |

OTHER PUBLICATIONS

Office Action issued for counterpart Chinese Application 202210589131.2, issued by The State Intellectual Property Office of People's Republic of China on Nov. 17, 2023.

* cited by examiner

ALERT CONTROL DEVICE, MOBILE OBJECT, ALERT CONTROLLING METHOD AND COMPUTER-READABLE STORAGE MEDIUM

The contents of the following Japanese patent application (s) are incorporated herein by reference:
NO. 2021-101990 filed on Jun. 18, 2021.

BACKGROUND

1. Technical Field

The present invention relates to an alert control device, a mobile object, an alert controlling method, and a computer-readable storage medium.

2. Related Art

Patent Document 1 describes about a technique for acquiring first acquisition information instructing that a right and left turn vehicle facing a vehicle senses a dead angle region of the right and left turn vehicle, and determining whether or not to sense the dead angle region of the right and left turn vehicle based on the first acquisition information.

Prior Art Document

Patent Document 1: Japanese Patent Application Publication No. 2018-133072

DESCRIPTION OF EXEMPLARY EMBODIMENTS

Hereinafter, the present invention will be described through embodiments of the invention, but the following embodiments do not limit the claimed invention, and all the combinations of the features described in the embodiment(s) are not necessarily essential to means provided by aspects of the invention.

Figure 1:
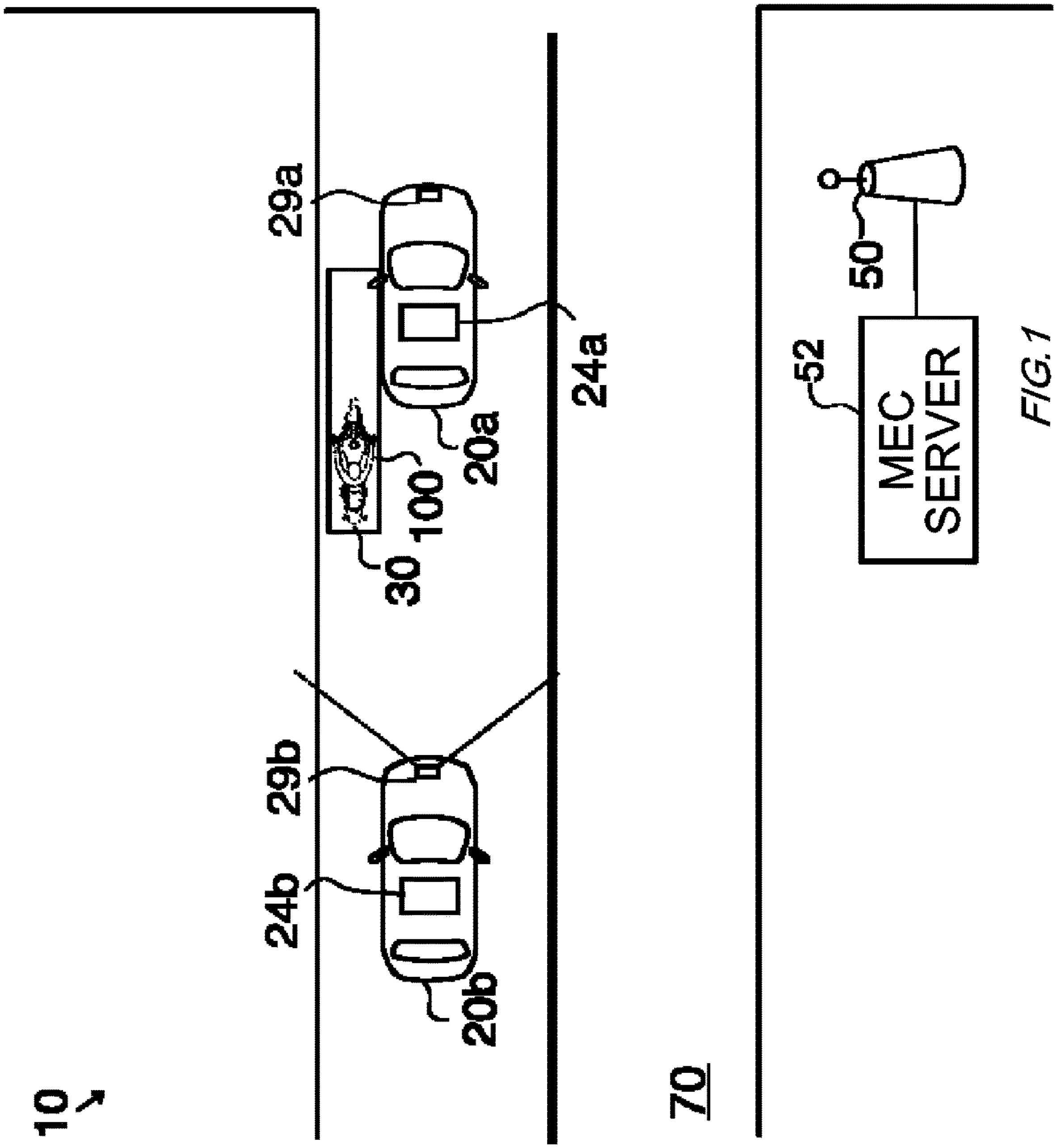
FIG. 1 schematically shows a usage scene of an alert system 10.

FIG. 1 schematically shows a usage scene of an alert system 10. The alert system 10 includes a vehicle 20*a* and a vehicle 20*b*, and a base station 50 and a MEC server 52. The vehicle 20*a* and the vehicle 20*b* are one example of mobile objects.

As shown in FIG. 1, the vehicle 20*a* and the vehicle 20*b* are driving along a driveway 70. The vehicle 20*a* includes an alert control device 24*a* and a sensor 29*a*. The vehicle 20*b* includes an alert control device 24*b* and a sensor 29*b*. The sensor 29*a* can capture an image of what is in front of the vehicle 20*a*. The sensor 29*b* can capture an image of what is in front of the vehicle 20*b*.

FIG. 1 shows a scene in which a driver of the vehicle 20*a* is about to turn the vehicle 20*a* to left. In response to the driver of the vehicle 20*a* operating an operation member of an indicator, the indicator of the vehicle 20*a* is operated to display "left side". At this time, the alert control device 24*a* identifies as a risk area, an area 100 on a rear left side which is a blind spot for a passenger in the vehicle 20 and to be outside a recognition range of the sensor 29*a*. Then, the alert control device 24*a* transmits risk area information containing location information of the area 100 through wireless communication. Note that, in the present embodiment, the sensor 29*a* included in the vehicle 20*a* can not recognize an object in areas on the rear left side area and a rear right side.

In FIG. 1, the vehicle 20*b* is positioned behind the vehicle 20*a*, and can recognize the area 100 by means of the sensor 29*b*. When the alert control device 24*b* of the vehicle 20*b* receives the risk area information transmitted from the vehicle 20*a*, the alert control device 24*b* then determines from the location information contained in the risk area information that the area 100 in front of the vehicle 20*b* is being the risk area for the vehicle 20*a*. The alert control device 24*b* determines from image information acquired by the sensor 29*b*, whether there is an object in the area 100. As shown in FIG. 1, there is a motorcycle 30 in the area 100. Therefore, the alert control device 24*b* analyzes the image information acquired by the sensor 29*b*, and when determining that there is the motorcycle 30 in the area 100, transmits response information representing that there is the motorcycle 30 in the area 100 to the vehicle 20*a* through wireless communication. The alert control device 24*b* transmits, when it is determined that there is no object in the area 100, response information representing that there is no object in the area 100 to the vehicle 20*a* through wireless communication.

In the vehicle 20*a*, when the alert control device 24*a* receives the response information representing that there is the object in the area 100 from the vehicle 20*b*, the alert control device 24*a* displays an alert to the passenger of the vehicle 20*a*.

As above, when the vehicle 20*a* turns left, the alert control device 24*a* identifies as the risk area, the area on the rear left side of the vehicle 20*a* which is to be the blind spot, and transmits the alert information containing the location information of the risk area to another vehicle through wireless communication. When the other vehicle receives the alert information, the other vehicle then determines whether there is an object in the risk area and transmits response information representing whether there is an object in the risk area through wireless communication. In this way, the vehicle 20*a* can cause the other vehicle to recognize the risk area which can not be recognized by the vehicle 20*a*, and acquire a recognition result obtained by the other vehicle. Thereby, if there is an object such as a motorcycle in the area to be the blind spot when the vehicle 20*a* turns left, the passenger of the vehicle 20*a* can be notified. Accordingly, the passenger of the vehicle 20*a* can recognize a potential risk that may occur when the vehicle 20*a* turns left.

The communication between the alert control device 24*a* and the alert control device 24*b* is carried out by direct communication. For example, the alert control device 24*a* conducts the direct communication with an alert control device 24 of another vehicle 20 by means of short-distance direct communication in Cellular-V2X. The short-distance direct communication in Cellular-V2X includes a communication standard such as LTE-V2X PC5 or 5G-V2X PC5 (abbreviated as "PC5" in the present embodiment). An embodiment using Wi-Fi (registered trademark), or DSRC (Dedicated Short Range Communications) for the direct communication may also be adopted. The alert control device 24*a* may conduct communication with the alert control device 24*b* via the base station 50 and the MEC server 52. Any direct communication method such as Bluetooth (registered trademark) may be adopted for the direct communication other than Cellular-V2X or DSRC (registered trademark). The alert control device 24*a* may conduct the direct communication between the alert control device 24*b* by using communication infrastructure in ITS (Intelligent Transport Systems).

Figure 2:
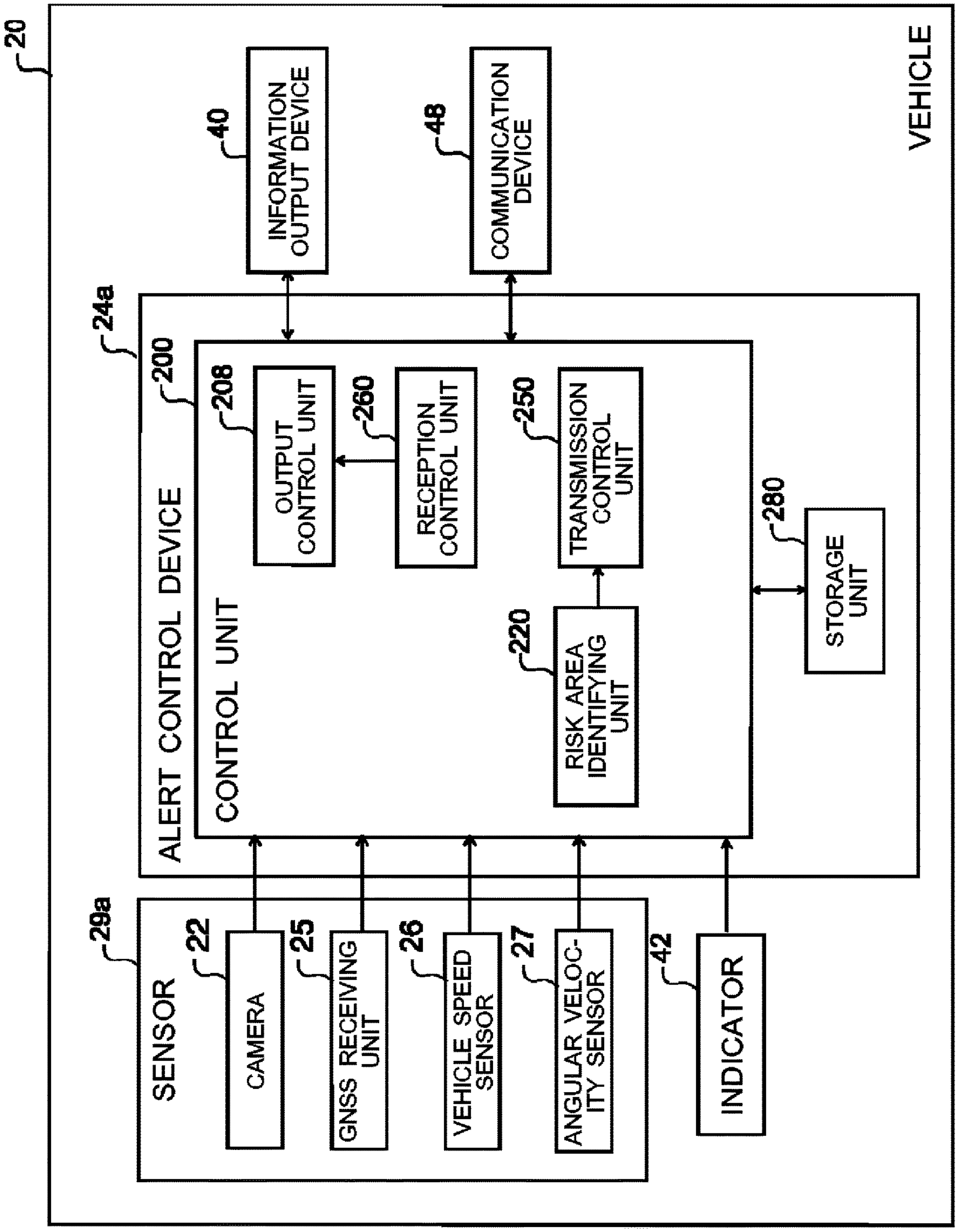
FIG. 2 shows a system configuration of a vehicle 20*a*.

FIG. 2 shows a system configuration of the vehicle 20*a*. The vehicle 20*a* includes the sensor 29*a*, the alert control device 24*a*, a communication device 48, an information output device 40, and an indicator 42.

The sensor 29 includes a camera 22, a GNSS receiving unit 25, a vehicle speed sensor 26, and an angular velocity sensor 27. The GNSS receiving unit 25 receives a radio wave transmitted from a GNSS (Global Navigation Satellite System) satellite. The GNSS receiving unit 25 generates information representing a current location of a vehicle 20 based on a signal received from the GNSS satellite. The camera 22 is one example of an image capturing unit mounted on the vehicle 20. The camera 22 generates image information by capturing an image of what is in front of the vehicle 20. The camera 22 may be a monocular camera. The camera 22 may also be a compound eye camera or a camera that can acquire information on a distance to an object. The angular velocity sensor 27 may be a gyro sensor.

The communication device 48 is in charge of conducting direct communication with another vehicle 20. For example, the communication device 48 conducts wireless communication through a PC5 interface. The communication device 48 is in charge of conducting communication with the MEC server 52 via the base station 50. For example, the communication device 48 conducts wireless communication through an Uu interface.

The alert control device 24 includes a control unit 200, and a storage unit 280. The control unit 200 is implemented by means of a circuit of an arithmetic processing device including a processor, for example. The storage unit 280 is implemented including a non-volatile storage media. The control unit 200 performs processing by using information stored in the storage unit 280. The control unit 200 may be implemented by an ECU (Electronic Control Unit) having a microcomputer including a CPU, ROM, RAM, I/O, bus, and the like.

The control unit 200 includes a risk area identifying unit 220, a transmission control unit 250, a reception control unit 260, and an output control unit 208. Information detected by the sensor 29 is input into the control unit 200. Information representing an operational status of the indicator 42 is input into the control unit 200. The control unit 200 also controls the information output device 40 and the communication device 48.

The risk area identifying unit 220 identifies a risk area outside the vehicle 20*a* based on operation information of the vehicle 20*a*. The operation information may represent operation of the indicator of the vehicle 20*a*. The operation information may be any information related to operation for changing a travel direction of the vehicle 20*a*.

The transmission control unit 250 conducts control of transmitting the risk area information containing the location information of the risk area to the outside of the vehicle 20*a*. The transmission control unit 250 may conduct control of transmitting the risk area information without specifying a destination. The transmission control unit 250 may conduct control of transmitting the risk area information by broadcasting.

The location information of the risk area may contain coordinate information of the risk area. The coordinate information may contain a plurality of pieces of coordinate information representing a range of the risk area. The coordinate information may represent a geographical position. For example, if the risk area is in a polygonal shape, the coordinate information of the risk area may represent a vertex of the polygon. The location information of the risk area may contain the coordinate information, and distance information representing a distance from a position indicated by the coordinate information. For example, the coordinate information for a particular spot in the risk area, and the distance information representing a width of the risk area taken by using the spot as reference may be contained.

The reception control unit 260 conducts control of receiving response information for the risk area information. The output control unit 208 conducts control of outputting alert information at least into the vehicle 20*a* based on the response information. For example, the output control unit 208 notifies the passenger of the vehicle 20*a* of the alert information through the information output device 40.

The output control unit 208 may conduct, after the transmission control unit 250 conducts the control of transmitting the risk area information, outputting control involving preliminary alert information to be output within a first period before receiving the response information, and alert information to be output within a second period after receiving the response information.

The risk area identifying unit 220 may identify the risk area based further on behavior information of the vehicle 20*a*. The behavior information of the vehicle 20*a* may contain at least one piece of information about a speed, an acceleration, or an angular velocity of the vehicle 20*a*.

The risk area identifying unit 220 may identify the risk area based further on map information containing a movement path of the vehicle 20*a*. The map information may contain intersection information, curve information, and lane information about a driveway. The risk area identifying unit 220 may identify the risk area based on the intersection information, the curve information, and the lane information.

The risk area identifying unit 220 may determine, based on the operation information, the behavior information of the vehicle 20*a*, and the map information containing the movement path of the vehicle 20*a*, whether at least any of a left turn, a right turn, a lane change, or overtaking is to be performed, and, based on this determination, determine whether to identify an area positioned on any of a rear left side, a rear right side, a front left side, or a front right side of the traveling direction of the vehicle 20*a* as the risk area.

The risk area identifying unit 220 may identify a change in a direction of the travel direction of the vehicle 20*a* based on the operation information, and determine, based on the change in the direction, whether to identify the area positioned on any of the rear left side, the rear right side, the front left side, or the front right side of the traveling direction of the vehicle 20*a* as the risk area.

The reception control unit 260 conducts control of receiving response information transmitted from another vehicle 20*a* in response to the risk area information. The reception control unit 260 may conduct control of receiving the response information representing that there is another vehicle in the risk area. The transmission control unit 250 may transmit the risk area information by the direct communication and indirect communication conducted through the base station 50. The reception control unit 260 may receive the response information by direct communication and indirect communication conducted through a cellular base station.

The information output device 40 outputs the alert information. The information output device 40 may have an HMI (Human Machine Interface) function. The information output device 40 may include a head-up display and a navigation system. If the information output device 40 includes the head-up display, the output control unit 208 may cause the head-up display to output light for displaying the alert information to the passenger of the vehicle 20*a*. If the information output device 40 includes an audio outputting device for outputting the alert information by sound, the output control unit 208 may cause the alert information to be output by sound. The output control unit 208 may communicate with a mobile terminal owned by the passenger of the vehicle 20, and thereby cause the alert information to be output from the mobile terminal.

Figure 3:
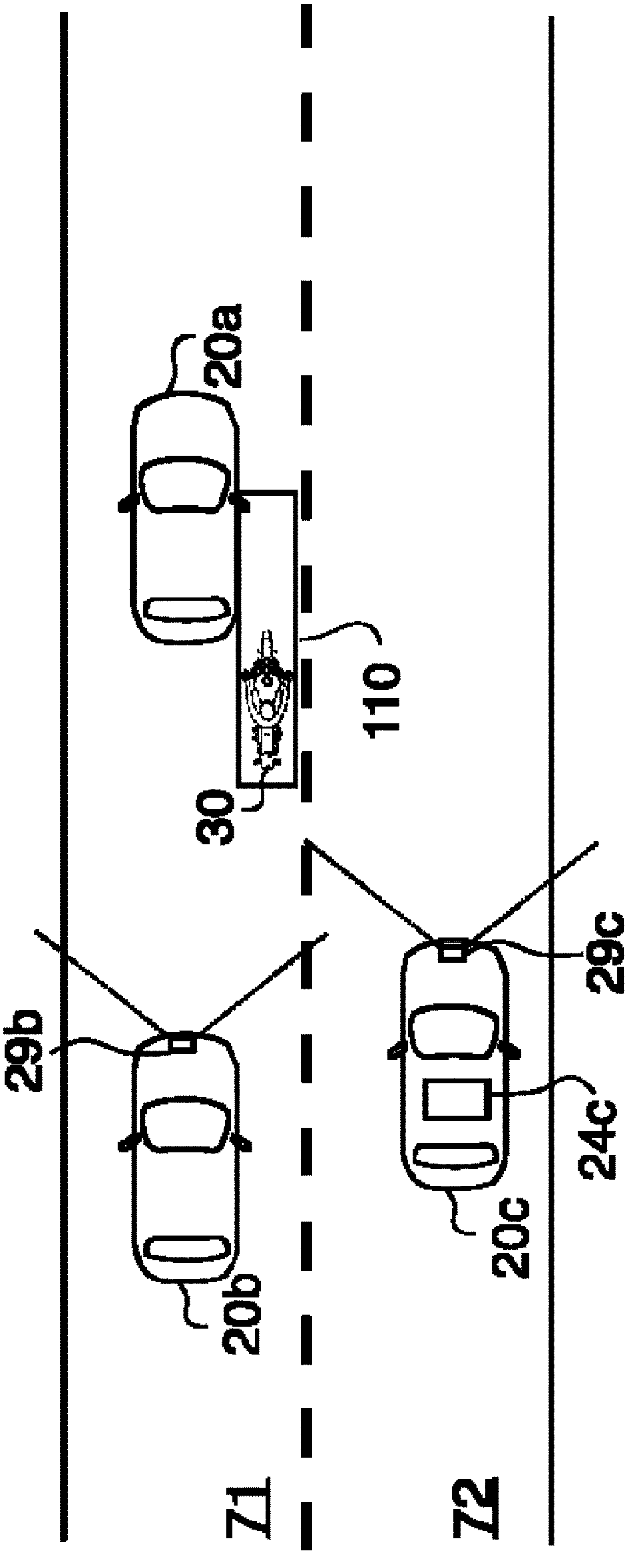
FIG. 3 shows another scene in which an alert control device 24*a* transmits risk area information.

FIG. 3 shows another scene in which the alert control device 24*a* transmits the risk area information. FIG. 3 shows a scene in which the vehicle 20*a* is driving a left side lane 71 out of two lanes in each direction, and the vehicle 20*a* is changing to a right side lane 72. A vehicle 20*b* is driving behind the vehicle 20*a* in the left side lane 71, and a vehicle 20*c* is driving behind the vehicle 20*a* in the right side lane 72. Similar to the vehicle 20*b*, the vehicle 20*c* has an alert control device 24*c* including a sensor 29*c* for detecting an object in front of the vehicle 20*c*, and a function for conducting wireless communication with the alert control device 24*a*.

In response to the driver of the vehicle 20*a* operating the operation member of the indicator 42, the indicator 42 is operated to display "right side". At this time, the risk area identifying unit 220 identifies as a risk area, an area 110 on a rear right side which is a blind spot for a passenger in the vehicle 20*a* and outside a recognition range of the sensor 29*a*. The risk area identifying unit 220 may determine a width of the risk area according to a vehicle speed detected by the vehicle speed sensor 26. The faster the vehicle speed detected by the vehicle speed sensor 26 is, the wider the risk area identifying unit 220 may determine the risk area. The alert control device 24*a* transmits risk area information containing location information of the area 110 identified by the risk area identifying unit 220 through wireless communication without specifying a destination.

When the alert control device 24*b* of the vehicle 20*b* receives the risk area information transmitted by the vehicle 20*a*, the alert control device 24*b* then identifies the area 110 based on the location information contained in the risk area information, and determines whether there is an object in the area 110 from image information acquired by the sensor 29*b*. As shown in FIG. 3, there is a motorcycle 30 in the area 110. The alert control device 24*b* analyzes the image acquired by the sensor 29*b*, and when determined that there is the motorcycle 30 in the area 110, then transmits response information representing that there is the motorcycle 30 in the area 110 to the vehicle 20*a* through wireless communication. Similarly, the alert control device 24*c* transmits, when it is determined that there is an object in the area 110, response information representing that there is the object in the area 110 to the vehicle 20*a* through wireless communication.

When the alert control device 24*a* receives the response information from the alert control device 24*b* and the alert control device 24*c*, the output control unit 208 causes alert information to be output to the passenger of the vehicle 20*a* through the information output device 40. Thereby, the passenger of the vehicle 20*a* can be notified that there is the motorcycle 30 in the area 110. Accordingly, the passenger of the vehicle 20*a* can recognize a potential risk that may occur from changing a lane.

The risk area identifying unit 220 may identify, when the vehicle 20*a* changes to a left side lane, an area on a rear left side as the risk area.

Figure 4:
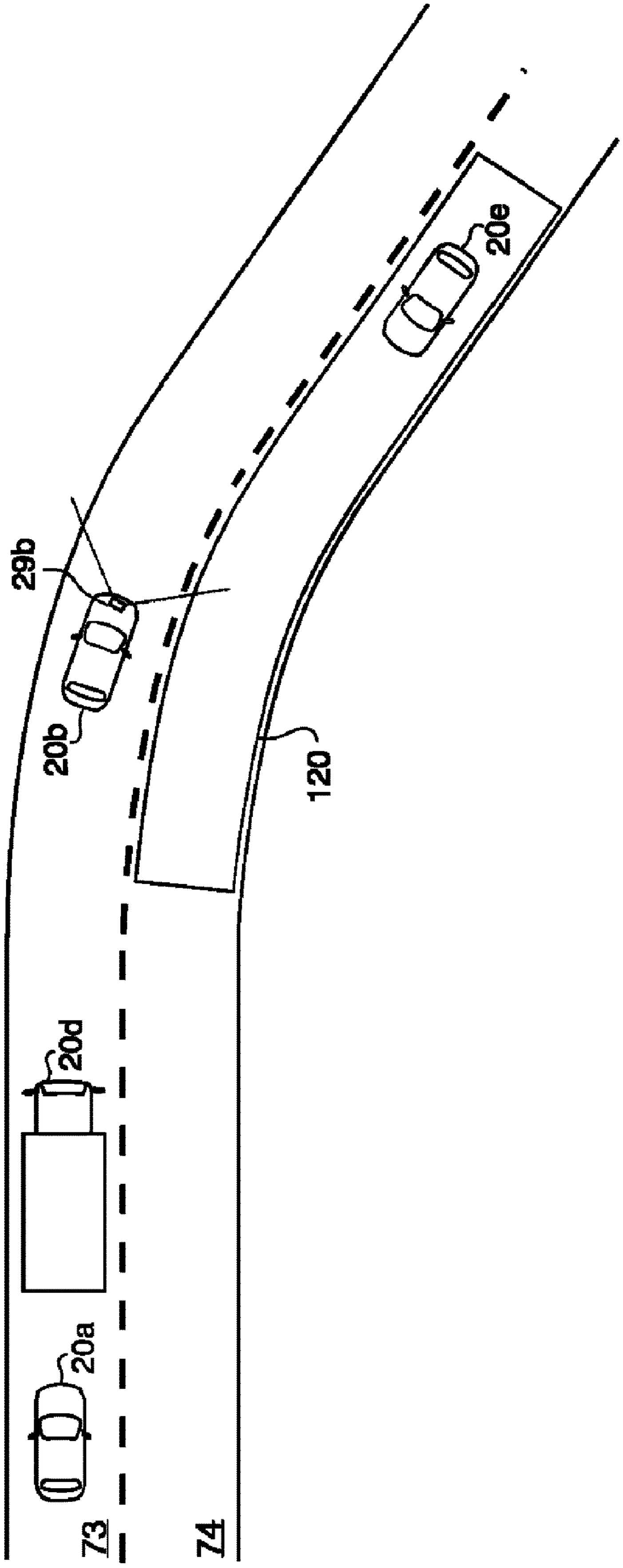
FIG. 4 shows yet another scene in which the alert control device 24*a* transmits risk area information.

FIG. 4 shows yet another scene in which the alert control device 24*a* transmits the risk area information. FIG. 4 shows a scene in which the vehicle 20*a* is driving a left side lane 73 in a driveway having a single lane in each direction, and the vehicle 20*a* is about to change its course into an opposite lane 74 in order to overtake a vehicle 20*d* ahead. A vehicle 20*b* is driving in front of the vehicle 20*d* in the lane 73, and a vehicle 20*e* is driving in front of the vehicle 20*a* in the opposite lane 74.

In response to the driver of the vehicle 20*a* operating the operation member of the indicator 42 for overtaking, the indicator 42 is operated to display "right side". In this case, the risk area identifying unit 220 determines that the vehicle 20*a* is about to overtake by crossing the opposite lane 74 based on lane information contained in road information. In this case, the risk area identifying unit 220 identifies an area 120 along the opposite lane 74 as a risk area. Also, the risk area identifying unit 220 identifies the area 120 so as to include an area to be outside a recognition range of a passenger of the vehicle 20*a* and the sensor 29*a* because there is the vehicle 20*d*. The risk area identifying unit 220 may identify the area 120 so as to include an area to be outside a recognition range of the passenger of the vehicle 20*a* and the sensor 29*a* when the vehicle 20*a* crosses the opposite lane 74, based on curve information contained in the road information. The faster a vehicle speed detected by the vehicle speed sensor 26 is, the longer the area 120 may be identified by the risk area identifying unit 220 along the opposite lane 74.

The alert control device 24*a* transmits risk area information containing location information of an area 120 identified by the risk area identifying unit 220 through wireless communication without specifying a destination.

When the alert control device 24*b* of the vehicle 20*b* receives the risk area information transmitted by the vehicle 20*a*, the alert control device 24*b* then identifies the area 120 based on the location information contained in the risk area information, and determines whether there is an object in the area 120 from image information acquired by the sensor 29*b*. As shown in FIG. 4, there is the vehicle 20*e* in the area 120. The alert control device 24*b* analyzes the image acquired by the sensor 29*b*, and when determined that there is the vehicle 20*e* in the area 120, then transmits response information representing that there is the vehicle in the area 120 to the vehicle 20*a* by wireless communication. If the alert control device 24*a* receives the response information from the alert control device 24*b*, the output control unit 208 causes alert information to be output to the passenger of the vehicle 20*a* through the information output device 40. Accordingly, the passenger of the vehicle 20*a* can recognize a potential risk that may occur from overtaking.

The sensor 29*b* of the vehicle 20*b* can recognize only a part of the area 120. In that case, the alert control device 24*b* of the vehicle 20*b* may include range information representing a range recognized by the alert control device 24*b* within the area 120 in response information, and transmits the response information. The output control unit 208 of the alert control device 24*a* may cause, even when response information representing that there is no vehicle is received from the alert control device 24*b*, if the recognized area identified based on the range information contained in the response information is a part of the area 120, alert information representing that there is an unrecognized area to be output. On the other hand, when the output control unit 208 receives response information representing, based on range information contained in a plurality of pieces of response information received from a plurality of other vehicles, that there is no region unrecognized by any vehicles in the area 120, and there is no vehicle in the area 120 from every other vehicle, then the output control unit 208 may cause the information output device 40 to output information representing that no vehicle has been recognized in the area 120.

The risk area identifying unit 220 may further identify, when the vehicle 20*a* crosses the opposite lane on the right side, an area on a rear right side as a risk area.

Figure 5:
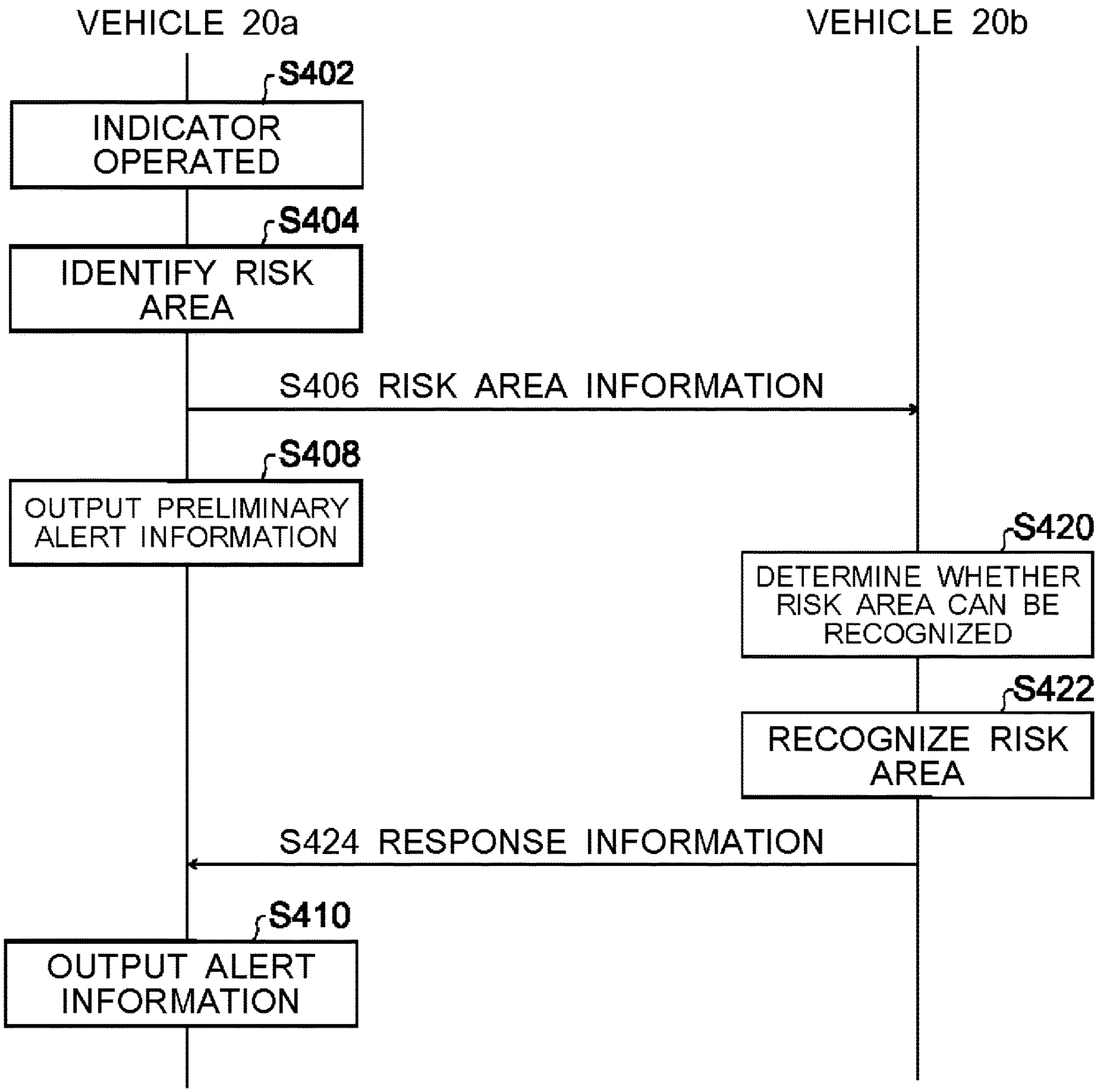
FIG. 5 schematically shows a processing flow performed by the vehicle 20*a* and a vehicle 20*b*.

FIG. 5 schematically shows a processing flow performed by the vehicle 20*a* and the vehicle 20*b*. FIG. 5 shows the processing flow of when the vehicle 20*a* communicates with another vehicle by using a PC5 interface.

When the risk area identifying unit 220 detects that the indicator 42 is operated in S402, then the risk area identifying unit 220 identifies a risk area in S404. As described with reference to FIG. 1, FIG. 3, FIG. 4 etc., the risk area identifying unit 220 identifies the risk area on a rear left side, rear right side, front right side, or the like of the vehicle 20 based on an operating action of the indicator 42, the vehicle speed of the vehicle 20, and the road information.

When the risk area identifying unit 220 has identified the risk area, the transmission control unit 250 transmits risk area information in S406. In this case, the transmission control unit 250 may transmit the risk area information without specifying a destination. After the risk area information is transmitted, the output control unit 208 caused the information output device 40 to output a preliminary alert. The preliminary alert may be a minor level of alert information that represents that there is the risk area.

When the alert control device 24*b* of the vehicle 20*b* receives the risk area information transmitted from the alert control device 24*a*, the alert control device 24*b* then determines whether the risk area can be recognized by the sensor 29*b* based on a position of the risk area identified from the location information of the risk area, and a current location and orientation of the vehicle 20*b*. If the risk area can be recognized by the sensor 29*b*, then in S422, the alert control device 24*b* recognizes within the risk area and transmits response information containing a recognition result showing whether there is an object within the risk area to the vehicle 20*a*.

When the output control unit 208 of the alert control device 24*a* receives the response information from the alert control device 24*b*, the output control unit 208 then causes the information output device 40 to output alert information based on the response information. When the output control unit 208 has received at least one response information representing that there is another vehicle in the risk area, then even if the output control unit 208 has received response information representing that there is no other vehicle in the risk area from another vehicle, the output control unit 208 may cause the information output device 40 to output alert information at a first alert level. On the other hand, when all pieces of the received response information represent that there is no other vehicle in the risk area, the information output device 40 may be caused to output alert information at a third alert level being lower than the first alert level. With respect to that, when the output control unit

208 has received not even a single piece of response information in response to the risk area information, the output control unit 208 may cause the information output device 40 to output alert information at a second alert level being between the first alert level and the third alert level.

Figure 6:
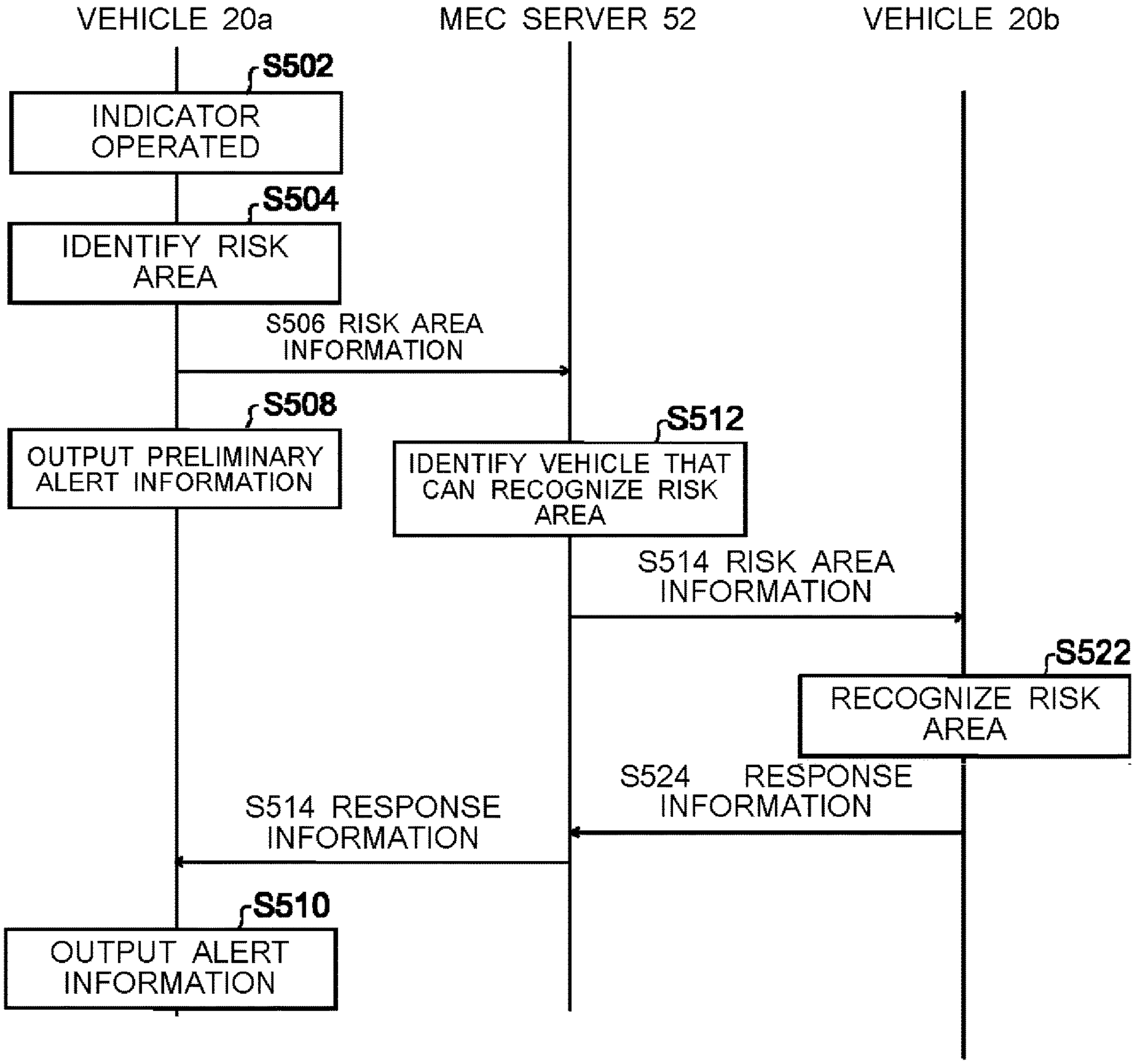
FIG. 6 schematically shows a processing flow performed by the vehicle 20*a*, a MEC server 52, and the vehicle 20*b*.

FIG. 6 schematically shows a processing flow performed by the vehicle 20*a*, the MEC server 52, and the vehicle 20*b*. FIG. 6 shows the processing flow of when the vehicle 20*a* communicates with another vehicle by using an Uu interface.

If the risk area identifying unit 220 detects that the indicator 42 is operated in S502, then the risk area identifying unit 220 identifies a risk area in S504. As described with reference to FIG. 1, FIG. 3, FIG. 4 etc., the risk area identifying unit 220 identifies the risk area on a rear left side, rear right side, front right side, or the like of the vehicle 20 based on an operating action of the indicator 42, the vehicle speed of the vehicle 20, and the road information.

When the risk area identifying unit 220 has identified the risk area, the transmission control unit 250 transmits risk area information in S506. The transmission control unit 250 transmits the risk area information to the MEC server 52 through the Uu interface, for example. In S512, the MEC server 52 identifies a vehicle being at a position from where the risk area can be recognized based on current locations of a plurality of vehicles managed by the MEC server 52. In S514, the MEC server 52 transmits the risk area information received from the alert control device 24*a* to a vehicle selected in S512 through the Uu interface.

When the alert control device 24*b* receives the risk area information transmitted from the MEC server 52, the alert control device 24*b* then recognizes within the risk area in S522, and transmits response information containing a recognition result showing whether there is an object in the risk area to the MEC server 52 in S524. In S514, the MEC server 52 transmits the response information received from the alert control device 24*b* to the alert control device 24*a* of the vehicle 20*a*.

When the output control unit 208 of the alert control device 24*a* receives the response information from the MEC server 52, the output control unit 208 then causes the information output device 40 to output alert information based on the response information in S510. Here, outputting the alert information is processed in the same manner as that described above, and thereby is omitted from being described.

Note that, an embodiment in which an alert control device 24*a* simultaneously conducts transmission of risk area information by a communication method for conducting direct communication by using a PC5 interface or the like as described with respect to FIG. 5, and transmission of risk area information by communication method performed via a cellular base station by using an Uu interface or the like with respect to FIG. 6, may be adopted.

The alert system 10 described above can cause another vehicle to recognize an area to be a blind spot for the vehicle 20*a* at a time of turning left or changing a lane, and thereby acquire a recognition result. Thereby, the passenger of the vehicle 20*a* can be alerted when there is another vehicle or the like in the risk area at a time of turning left or changing the lane.

In the above description, the case in which the alert control device 24 identifies the risk area in response to the operation of the indicator, and transmits the risk area information has mainly been described. However, regardless of whether the indicator is being operated, the alert control device 24*a* may identify a risk area when the vehicle 20 shows predetermined behavior based on acceleration calculated by information detected by the angular velocity sensor 27 or information detected by the vehicle speed sensor 26, and transmit the risk area information. Alternatively, the alert control device 24*a* may identify a risk area when the vehicle 20*a* is predicted to turn left within a predetermine timeframe based on a scheduled driving route pre-set for the vehicle 20*a*, a current location of the vehicle 20*a*, and location information about an intersection, and transmit the risk area information.

In the above embodiment, the case in which the driving on the left side is performed as specified in a traffic rule has been described. In a situation where driving on the right side is specified in a traffic rule, the risk area identifying unit 220 may identify, when the vehicle 20*a* turns right, an area on the rear right side as a risk area. In addition, the risk area identifying unit 220 may identify, when the vehicle 20*a* crosses an opposite lane on a left side for overtaking, a front left side area as a risk area.

Note that, the vehicle 20 is one example of transportation equipment. The transportation equipment includes an automobile such as a passenger vehicle or a bus, a saddle-ride type vehicle, a bicycle, and the like. Also, a mobile object includes not only a person but also transportation equipment including an automobile such as a passenger vehicle or a bus, a saddle-ride type vehicle, a bicycle, and the like.

Figure 7:
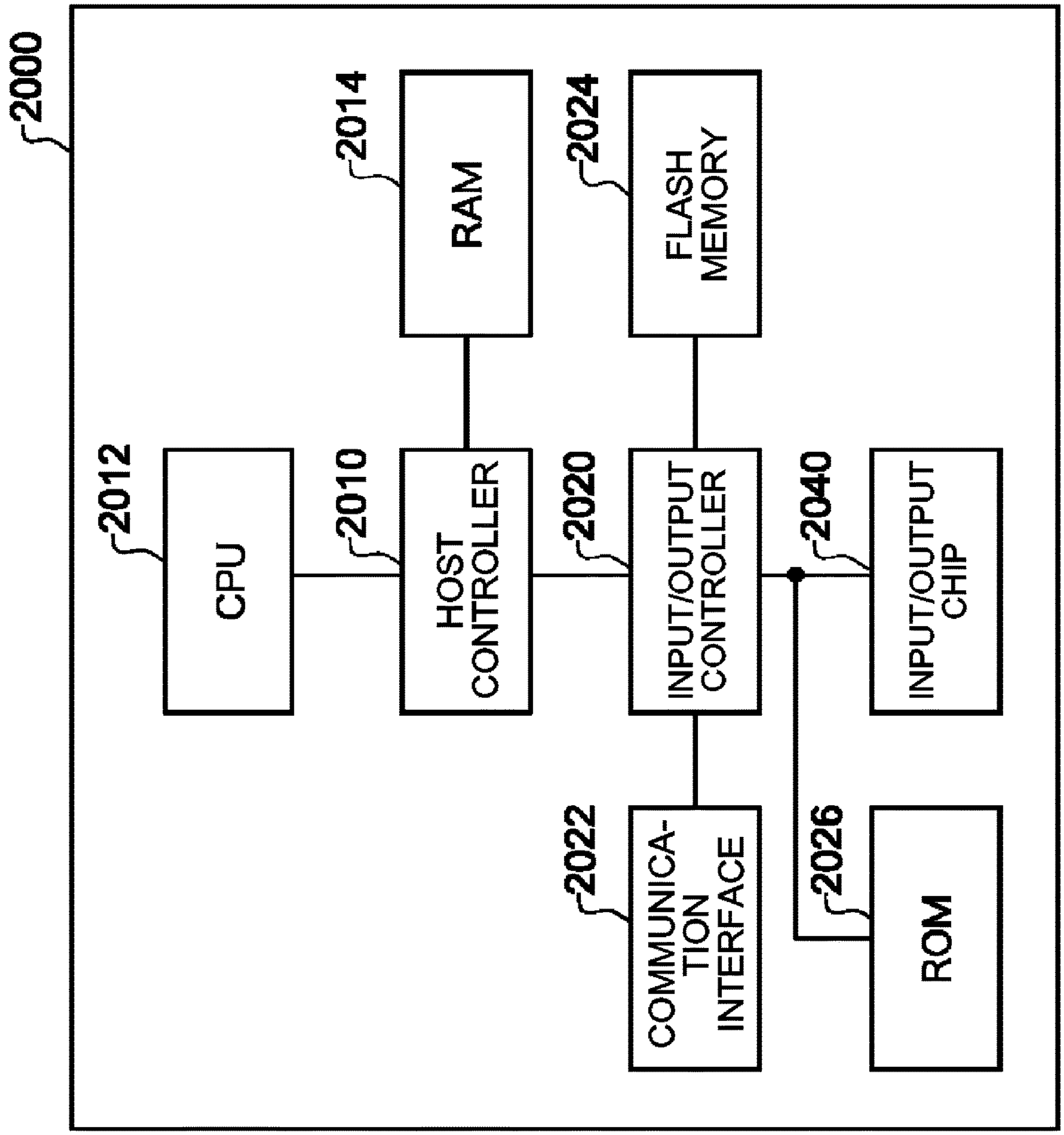
FIG. 7 shows an example of a computer 2000.

FIG. 7 shows an example of a computer 2000 in which a plurality of embodiments of the present invention may be entirely or partially embodied. A program that is installed in the computer 2000 can cause the computer 2000 to: function as a device such as the control device 24 of the embodiment or each unit of the device; perform operations associated with the device or the each unit of the device; and/or perform a process of the embodiment or a step of the process. Such a program may be executed by a CPU 2012 to cause the computer 2000 to perform certain operations associated with the processing procedures described herein and some of or all of the blocks in the block diagrams.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and a HDMI (registered trademark) port.

The program is provided via a network or a computer-readable medium such as a CD-ROM, a DVD-ROM, or a memory card. The RAM 2014, the ROM 2026, or the flash memory 2024 is an example of the computer-readable medium. Programs are installed in the flash memory 2024, the RAM 2014, or the ROM 2026 and executed by the CPU 2012. The information processing written in these programs is read by the computer 2000, and thereby cooperation between a program and the above-described various types of hardware resources is achieved. A device or method may be constituted by carrying out the operation or processing of information by using the computer 2000.

For example, when communication is carried out between the computer 2000 and an external device, the CPU 2012 may execute a communication program loaded onto the RAM 2014 to instruct communication processing to the communication interface 2022, based on the processing written in the communication program. The communication interface 2022, under control of the CPU 2012, reads transmission data stored on transmission buffering regions provided in recording media such as the RAM 2014 and the flash memory 2024, and transmits the read transmission data to a network and writes reception data received from a network to reception buffering regions or the like provided on the recording media.

In addition, the CPU 2012 may cause all or a necessary portion of a file or a database to be read into the RAM 2014, the file or the database having been stored in a recording medium such as the flash memory 2024, etc., and perform various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may perform various types of processing on the data read from the RAM 2014, which includes various types of operations, information processing, conditional judging, conditional branch, unconditional branch, search/replace of information, etc., as described herein and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby acquiring the attribute value of the second attribute associated with the first attribute satisfying the predetermined condition.

The programs or a software module described above may be stored on the computer 2000 or in a computer-readable medium near the computer 2000. A recording medium provided in a server system connected to a dedicated communication network or the Internet, such as a hard disk or RAM, can be used as the computer-readable medium. The programs stored in the computer-readable medium may be provided to the computer 2000 via the network.

The programs installed onto the computer 2000 for causing the computer 2000 to function as the control unit 200 may instruct the CPU 2012 or the like to cause the computer 2000 to function as each unit of the control unit 200. The information processing written in these programs is read by the computer 2000, and thereby functions as each unit of the control unit 200 being a concrete means realized by cooperation of software and the each type of hardware resources described above. With these concrete means, a particular control unit 200 suitable for an intended use can be configured by performing calculations or processing of information appropriate for the intended use of the computer 2000 of the present embodiment.

Various embodiments have been described by referring to the block diagrams and the like. In the block diagram, each block may represent (1) a step of a process in which an operation is executed, or (2) each unit of the device having a role of executing the operation. Specific steps and each unit may be implemented by a dedicated circuit, a programmable circuit supplied along with a computer-readable instruction stored on a computer-readable medium, and/or a processor supplied along with the computer-readable instruction stored on the computer-readable medium. Dedicated circuit may include digital and/or analog hardware circuits and may include integrated circuits (IC) and/or discrete circuits. Programmable circuit may include reconfigurable hardware circuits including logical AND, logical OR, logical XOR, logical NAND, logical NOR, and other logical operations, flip-flops, registers, memory elements, etc., such as field-programmable gate arrays (FPGA), programmable logic arrays (PLA), etc.

The computer-readable medium may include any tangible device capable of storing an instruction to be executed by an appropriate device, so that the computer-readable medium having the instruction stored thereon constitutes at least a part of a product including an instruction that may be executed in order to provide means to execute an operation specified by a processing procedure or a block diagram. Examples of computer-readable media may include an electronic storage medium, a magnetic storage medium, an optical storage medium, an electromagnetic storage medium, a semiconductor storage medium, and the like. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include any of assembler instructions, instruction-set-architecture (ISA) instructions, machine instructions, machine dependent instructions, microcode, firmware instructions, state-setting data, or either of a source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general purpose computer, special purpose computer, or other programmable data processing device, or to programmable circuit, locally or via a local area network (LAN), wide area network (WAN) such as the Internet, etc., to execute the computer-readable instructions to provide means for performing described processing procedure or operations specified in the block diagrams. Examples of processors include computer processors, processing units, microprocessors, digital signal processors, controllers, microcontrollers, etc.

While the embodiments of the present invention have been described, the technical scope of the present invention is not limited to the above-described embodiments. It is apparent to persons skilled in the art that various alterations and improvements can be added to the above-described embodiments. It is also apparent from the scope of the claim that embodiments added with such alterations or improvements can be included in the technical scope of the present invention.

It should be noted that the operations, procedures, steps, stages, etc. of each process performed by an device, system, program, and method shown in the claims, specification, or diagrams can be performed in any order as long as the order is not indicated by "prior to," "before," or the like and as long as the output from a previous process is not used in a later process. Even if the operational flow is described by using phrases such as "first" or "next" in the claims, specification, or diagrams, it does not necessarily mean that the process must be performed in this order.

EXPLANATION OF REFERENCES

10: alert system;
20: vehicle;
22: camera;
24: alert control device;
25: GNSS receiving unit;
26: vehicle speed sensor;
27: angular velocity sensor;
29: sensor;
30: motorcycle;
40: information output device;
42: indicator;
48: communication device;
50: base station;
52: MEC server;
70: driveway;
100, 110, 120: area;
71, 72, 73, 74: lane;
200: control unit;
208: output control unit;
220: risk area identifying unit;
250: transmission control unit;
260: reception control unit;
280: storage unit;
2000: computer;
2010: host controller;
2012: CPU;
2014: RAM;
2020: input/output controller;
2022: communication interface;
2024: flash memory;
2026: ROM;
2040: input/output chip

What is claimed is:

1. An alert control device, comprising:
at least one processor, wherein
the at least one processor is configured to
identify a risk area outside a mobile object based on operation information of the mobile object;
conduct control of transmitting risk area information containing location information of the risk area to an outside of the mobile object;
conduct control of receiving response information for the risk area information; and
conduct control of outputting alert information at least into the mobile object based on the response information, wherein
the at least one processor is further configured to perform, after the conducting the control of transmitting, outputting control involving preliminary alert information to be output within a first period before receiving the response information, and the alert information to be output within a second period after receiving the response information.

2. The alert control device according to claim 1, wherein the mobile object is a vehicle, and the operation information is information configured to represent operation of an indicator of the vehicle.

3. The alert control device according to claim 2, wherein the at least one processor is further configured to the risk area identifying unit is configured to identify the risk area based further on behavior information of the mobile object.

4. The alert control device according to claim 2, wherein the at least one processor is further configured to identify the risk area based further on map information containing a movement path of the mobile object.

5. The alert control device according to claim 1, wherein the at least one processor is further configured to to identify the risk area based further on behavior information of the mobile object.

6. The alert control device according to claim 5, wherein the behavior information of the mobile object contains at least one piece of information about a speed, an acceleration, or an angular velocity of the mobile object.

7. The alert control device according to claim 1, wherein the at least one processor is further configured to identify the risk area based further on map information containing a movement path of the mobile object.

8. The alert control device according to claim 1, wherein the at least one processor is further configured to determine, based on the operation information, behavior information of the mobile object, and map information containing a movement path of the mobile object, whether at least any of a left turn, a right turn, a lane change, or overtaking is to be performed, and, based on the determination, determine whether to identify an area positioned on any of a rear left side, a rear right side, a front left side, or a front right side of a traveling direction of the mobile object as the risk area.

9. The alert control device according to claim 1, wherein the at least one processor is further configured to identify a change in a direction of a travel direction of the mobile object based on the operation information, and determine, based on the change in the direction, whether to identify an area positioned on any of a rear left side, a rear right side, a front left side, or a front right side of a traveling direction of the mobile object as the risk area.

10. The alert control device according to claim 1, wherein the at least one processor is further configured to conduct control of receiving the response information transmitted from another mobile object in response to the risk area information.

11. The alert control device according to claim 10, wherein the at least one processor is further configured to conduct control of receiving the response information representing that there is another mobile object in the risk area.

12. The alert control device according to claim 1, wherein the at least one processor is further configured to transmit the risk area information by direct communication and indirect communication conducted through a cellular base station, and the at least one processor is further configured to receive the response information by direct communication and indirect communication conducted through a cellular base station.

13. The alert control device according to claim 1, wherein the mobile object is a vehicle.

14. The alert control device according to claim 1, wherein the alert control device is installed in a mobile object.

15. An alert controlling method, comprising:

identifying a risk area outside a mobile object based on operation information of the mobile object;

conducting control of transmitting risk area information containing location information of the risk area to an outside of the mobile object;

conducting control of receiving response information for the risk area information;

conducting control of outputting alert information at least into the mobile object based on the response information; and performing, after the conducting the control of transmitting, outputting control involving preliminary alert information to be output within a first period before receiving the response information, and the alert information to be output within a second period after receiving the response information.

16. A non-transitory computer-readable storage medium having stored thereon a program that causes a computer to perform operations comprising:

identifying a risk area outside a mobile object based on operation information of the mobile object;

conducting control of transmitting risk area information containing location information of the risk area to an outside of the mobile object;

conducting control of receiving response information for the risk area information;

conducting control of outputting alert information at least into the mobile object based on the response information; and performing, after the conducting the control of transmitting, outputting control involving preliminary alert information to be output within a first period before receiving the response information, and the alert information to be output within a second period after receiving the response information.

17. An alert control device, comprising:

at least one processor, wherein the at least one processor is configured to identify a risk area outside a mobile object based on operation information of the mobile object;

conduct control of transmitting risk area information containing location information of the risk area to an outside of the mobile object;

conduct control of receiving response information for the risk area information; and conduct control of outputting alert information at least into the mobile object based on the response information, wherein the at least one processor is further configured to determine, based on the operation information, behavior information of the mobile object, and map information containing a movement path of the mobile object, whether at least any of a left turn, a right turn, a lane change, or overtaking is to be performed, and, based on the determination, determine whether to identify an area positioned on any of a rear left side, a rear right side, a front left side, or a front right side of a traveling direction of the mobile object as the risk area.

18. An alert controlling method, comprising:

identifying a risk area outside a mobile object based on operation information of the mobile object;

conducting control of transmitting risk area information containing location information of the risk area to an outside of the mobile object;

conducting control of receiving response information for the risk area information;

conducting control of outputting alert information at least into the mobile object based on the response information; and determining, based on the operation information, behavior information of the mobile object, and map information containing a movement path of the mobile object, whether at least any of a left turn, a right turn, a lane change, or overtaking is to be performed, and, based on the determination, determining whether to identify an area positioned on any of a rear left side, a rear right side, a front left side, or a front right side of a traveling direction of the mobile object as the risk area.

19. A non-transitory computer-readable storage medium having stored thereon a program that causes a computer to perform operations comprising:

identifying a risk area outside a mobile object based on operation information of the mobile object;

conducting control of transmitting risk area information containing location information of the risk area to an outside of the mobile object;

conducting control of receiving response information for the risk area information;

conducting control of outputting alert information at least into the mobile object based on the response information; and determining, based on the operation information, behavior information of the mobile object, and map information containing a movement path of the mobile object, whether at least any of a left turn, a right turn, a lane change, or overtaking is to be performed, and, based on the determination, determining whether to identify an area positioned on any of a rear left side, a rear right side, a front left side, or a front right side of a traveling direction of the mobile object as the risk area.

* * * * *